United States Patent
Bent et al.

(10) Patent No.: US 6,536,313 B1
(45) Date of Patent: Mar. 25, 2003

(54) METHOD FOR MAKING INSERT FOR ROTARY CUTTER

(75) Inventors: Donald G. Bent, Otter Lake, MI (US); Martin F. Jarrard, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/967,541

(22) Filed: Oct. 1, 2001

(51) Int. Cl.⁷ ............ B23B 1/00; B23B 27/00; B23P 13/04
(52) U.S. Cl. ............ 82/1.11; 82/46; 29/557
(58) Field of Search ............ 451/5, 9, 10; 82/1.11, 82/1.2, 1.3, 1.4, 1.5, 118, 129; 29/557, 558; 76/108.2, 108.4

(56) References Cited

U.S. PATENT DOCUMENTS

| | | | |
|---|---|---|---|
| 3,763,598 A | * 10/1973 | Hofler | 451/13 |
| 4,084,349 A | * 4/1978 | Farrell | 451/5 |
| 4,712,949 A | 12/1987 | Johnson | 407/42 |
| 4,817,213 A | * 4/1989 | Scobie | 29/527.6 |
| 4,848,040 A | * 7/1989 | Nishino | 451/5 |
| 4,968,195 A | * 11/1990 | Hayakawa et al. | 409/84 |
| 5,145,295 A | 9/1992 | Satran | 407/113 |
| 5,207,538 A | 5/1993 | Satran | 407/113 |
| 5,377,454 A | * 1/1995 | Pedersen et al. | 451/5 |
| 6,062,775 A | 5/2000 | Satran et al. | 407/46 |
| 6,146,065 A | 11/2000 | Isaksson | 407/114 |

* cited by examiner

Primary Examiner—A. L. Wellington
Assistant Examiner—Brian Walsh
(74) Attorney, Agent, or Firm—Leslie C. Hodges

(57) ABSTRACT

A method for making a cutting insert for use in an ID rotary cutter includes obtaining the profile of a convex surface portion of a finished part to be milled with the cutter, translating the profile a minimum distance away from a reference axis for the convex surface portion, and generating a reference contour by rotating the translated profile about the reference axis. A reference profile for a cutting edge of the cutting insert is obtained as the intersection of the reference contour with a reference plane that is disposed at a predetermined helix angle relative to the reference axis.

9 Claims, 3 Drawing Sheets

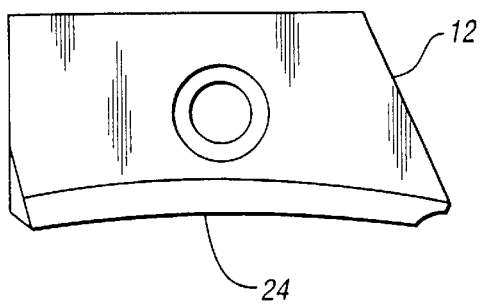
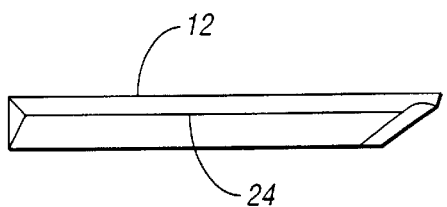
Fig. 6        Fig. 7
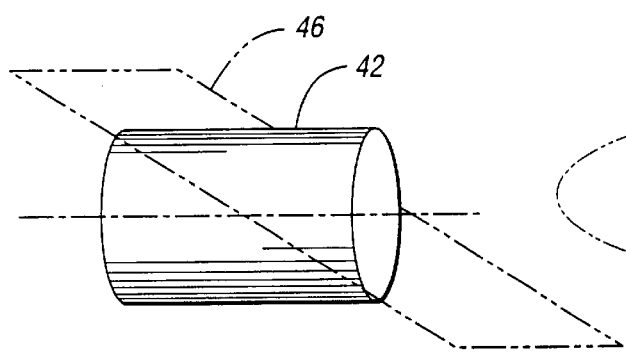
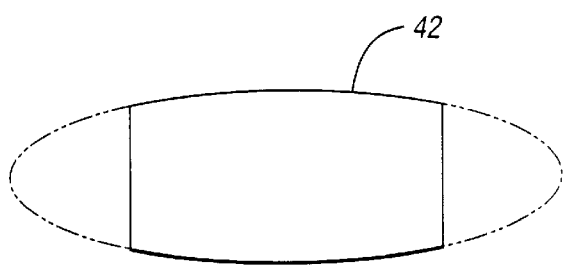
Fig. 8        Fig. 9
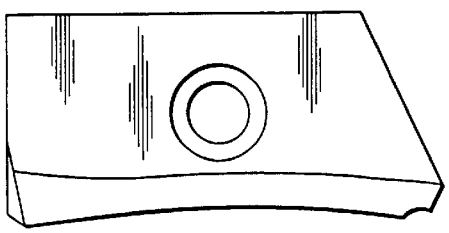
Fig. 10 (PRIOR ART)        Fig. 11 (PRIOR ART)

METHOD FOR MAKING INSERT FOR ROTARY CUTTER

TECHNICAL FIELD

The invention relates to a method of designing a cutting insert for a rotary milling tool or cutter useful in forming an external, generally-arcuate surface on a workpiece.

BACKGROUND OF THE INVENTION

The prior art teaches myriad methods for forming an external, generally-arcuate surface of a part, for example, an outside diameter of a generally-cylindrical part. Under one prior art approach, an internal-diameter (ID) cutter is provided that includes a cutter body that is rotatable about a first axis. The cutter body includes an axial bore whose inner wall supports a plurality of identical tool inserts such that the cutting edges of each insert project generally radially-inwardly into the body's axial bore. Prior to engagement of any of the inserts with the work, the cutter body is axially advanced relative to the work such that the first axis is positioned in parallel with the nominal or reference axis of the outer surface.

The cutter body is then rotated about the first axis and the cutter body is radially advanced relative to the reference axis, such that a like cutting edge on each insert serially engages the work to thereby generate the desired external contour. The axis of the rotating cutter body is thereafter orbited about the reference axis of the work in a plane generally orthogonal to the reference axis to thereby generate the rest of the desired external contour. In the event that the finished part includes a radial flange, the nominal inner diameter defined by the cutting edges of the inserts relative to the rotational axis of the tool body is made greater than the maximum diameter of the radial flange, and the rotational axis of the tool body is orbited around the nominal longitudinal axis of the cylindrical part to thereby simultaneously define both the radial flange and the nominal outside surface of the part.

Significantly, in order improve chip evacuation while further reducing tool pressure upon initial engagement with the work, the prior art teaches supporting the inserts in the cutter body such that each insert's cutting edge is located in the circular cutting path of the tool and is inclined or canted with respect to the rotary axis by a predetermined helix angle (also known as an axial rake angle). Such canted inserts, in turn, require a helical cutting edge to ensure that the relief angle formed along the entire length of the cutting edge, between the cutting face and a series of reference lines intersecting the rotary axis and the cutting edge when viewed in cross-section, remains substantially constant. The shape of the helical cutting edge of such canted inserts is often empirically defined through trial and error as a series of three-dimensional coordinates. Such empirical definition is further complicated if the resulting tool will be used to simultaneously form a second, relatively-raised arcuate surface contour on the work immediately adjacent to a first convex surface portion of relatively-lesser nominal diameter, for example, as when defining an adjacent radial flange on a cylindrical protrusion of a workpiece. A typical canted-edge insert produced in accordance with the prior art, featuring an empirically-determined double-helix curved cutting edge, is illustrated in FIGS. 10 and 11.

Once defined, the helical cutting edge is typically formed on each insert with a CNC machine using a piecewise-linear function (wherein the CNC machine moves in a series of short, straight lines between the several empirically-defined three-dimensional coordinates), and often requiring a five-axis grinder. In addition to the cost associated with empirically-defining the cutting edges and otherwise producing such inserts, the resulting piecewise-linear cutting edges of such canted inserts often produce finished surfaces characterized by greater dimensional variation than their noncanted counterparts.

SUMMARY OF THE INVENTION

It is an object of the invention to provide a method for making a cutting insert for use in an ID rotary cutter, wherein the insert includes a cutting edge that is supported at a nonzero helix angle relative to the rotational axis of the cutter, that overcomes the deficiencies of the prior art.

It is another object of the invention to provide a method for making a cutting insert for use in an ID rotary cutter that does not require an empirical determination of a plurality of cutting edge coordinates with which to generate a desired external, convex contour of a milled part.

It is a further object of the invention to provide a cutting edge on an insert for use in an ID rotary cutter that lies within a common reference plane to thereby reduce the cost and complexity associated with manufacture of the insert.

Under the invention, a method is provided for making a cutting insert useful for milling, with an ID rotary cutter, an outer surface of a workpiece whose desired contour includes a first surface portion having a minimum radius relative to a reference axis, and a second portion having a maximum radius relative to the reference axis. An exemplary method includes selecting a first reference plane intersecting both the reference axis and the outer surface, and obtaining a first profile of the desired contour as the intersection of the outer surface with the first reference plane. The exemplary method also includes translating the first profile within the first reference plane in a direction normal to the reference axis such that the first profile is no less than a minimum distance away from the first axis, the minimum distance being greater than the maximum radius and, preferably, equal to the sum of the maximum radius plus a predetermined safety factor. The method also includes rotating the translated first profile about the reference axis to generate a reference contour that constitutes an expanded version of the original, desired profile. Significantly, however, because the generated reference contour is based upon the translated first profile, the difference between the reference contour's minimum and maximum radii is identical to the difference between the original, desired contour's minimum and maximum radii.

The exemplary method further includes selecting a second reference plane disposed at a predetermined helix angle relative to the reference axis and intersecting the reference contour, obtaining a second profile of the reference contour as the intersection of the reference contour with the second reference plane, and forming a cutting edge of the insert based at least in part on the second profile. The helix angle is preferably selected based at least in part upon the design of the finished part, for example, such that the second reference plane intersects each longitudinal end of the generated reference contour. As a result, the second reference plane will necessarily likewise intersect the outer surface of the finished part along its entire finished length of the workpiece to be formed upon engagement of the insert's cutting edge. It will be appreciated that the material from which the part is to be milled is also accommodated when selecting the appropriate helix angle.

In accordance with a feature of the invention, the step of forming the insert's cutting edge preferably includes programming a CNC machine to follow the second profile. While the CNC machine is preferably capable of directly receiving CAD-generated profile information with which to form the cutting edge, the invention alternatively contemplates that the second profile be approximated using a plurality of three-dimensional coordinates. It will be appreciated that, because the cutting edge lies within the second reference plane, cutting inserts in accordance with the invention can conveniently be manufactured using three- or four-axis grinders, rather than the five-axis grinders required by the typical prior art design.

In accordance with another feature of the invention, a method for making a cutting insert for an ID rotary cutter useful for milling a cylindrical part of nominal diameter is also advantageously provided. Specifically, a method for making such a cutting insert includes selecting a first reference plane intersecting both the reference axis and the outer surface, and obtaining a first profile of the desired contour of the outer surface as the intersection of the outer surface with the first reference plane. The method further includes translating the first profile within the first reference plane in a direction normal to the reference axis such that the first profile is no less than a minimum distance away from the reference axis, the minimum distance being greater than the nominal radius; rotating the translated first profile about the reference axis to generate a reference contour; and projecting the reference contour onto a second reference plane that is disposed at a predetermined helix angle relative to the first reference plane.

In accordance with yet another feature of the invention, a cutting tool employing these cutting inserts beneficially provides a consistent tool pressure and cutting rate because the cutting edge of each insert forms a straight cutting edge when viewed from within the second reference plane. Additional benefits may include improved tool life and reduced tool chatter.

BRIEF DESCRIPTION OF THE DRAWINGS

FIG. 6 is a top plan view of one of the cutting inserts made in accordance with the invention, for use on an ID rotary cutter in generating the external surface of the generally-cylindrical nipple illustrated in FIG. 1;

FIG. 7 is a side elevational view of the cutting edge of the insert shown in FIG. 6, further illustrating its nominally-coplanar single-helix main cutting edge;

FIGS. 8 and 9 illustrate various steps of a second exemplary method for generating an external surface of a simple right-hand-cylindrical part; and FIGS. 10 and 11 are top plan and side elevational views, respectively, of a prior art insert whose cutting edge is empirically defined in accordance with the prior art, with its double-helix, piecewise-linear cutting edge clearly illustrated in FIG. 11.

DESCRIPTION OF THE PREFERRED EMBODIMENT

Figure 1:
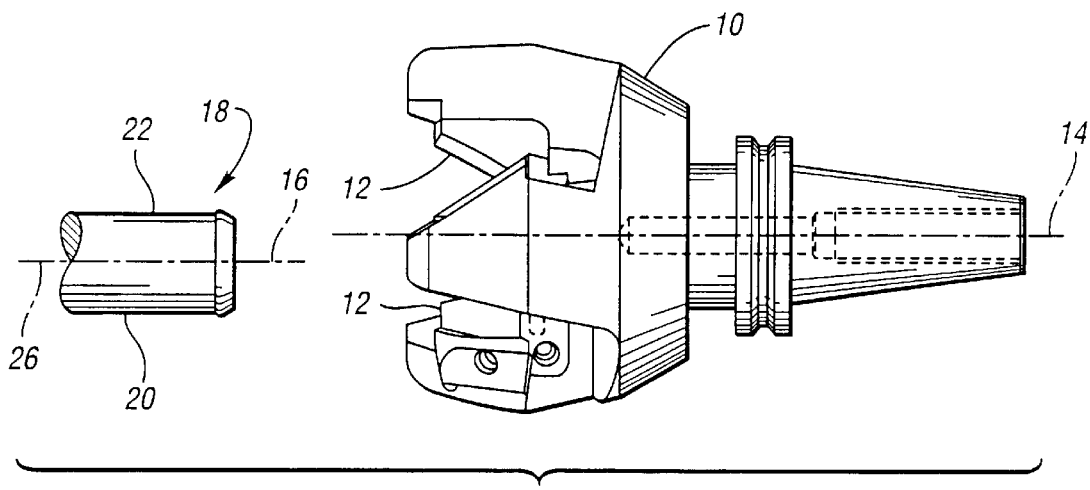
FIG. 1 is a side elevational view of an ID rotary cutter that includes a plurality of cutting inserts made in accordance with the invention, illustrated opposite a finished workpiece (a housing including a projecting, generally-cylindrical nipple) whose external surface is characterized by arcuate surface contours having a minimum diameter and a maximum diameter.

An exemplary ID rotary cutter 10 including a plurality of cutter inserts 12 made in accordance with the invention is illustrated in FIG. 1. The rotary cutter 10 is seen to be rotatable about a cutter axis 14 that is in a parallel-spaced relationship with the nominal longitudinal axis 16 of a generally-cylindrical part 18 having an external surface 20 that is to be milled by the cutter 10 to a desired contour 22. While the invention contemplates any suitable milling operation for generating an arcuate contour on the outer surface of a part that is otherwise held stationary during the milling operation, the invention is hereafter described in the context of generating a desired profile on the outer surface of a generally-cylindrical tubular nipple 18 projecting from an engine front cover that is adapted to receive a radiator hose (only the nipple 18 being is illustrated in FIG. 1). As seen in FIG. 1, the nipple's desired contour 22 is characterized by a minimum radius or diameter and a maximum radius or diameter.

Figure 3:
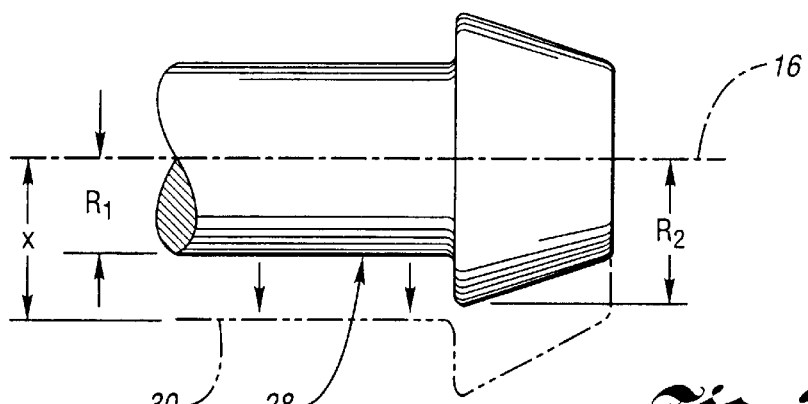
FIGS. 3–5 illustrate various steps of the exemplary method for generating a first external surface of a part, wherein the external surface is characterized by arcuate contours having a minimum diameter/radius and a maximum diameter/radius (the difference between the minimum and maximum radii of the desired contour being enlarged for clarity of illustration)
Figure 2:
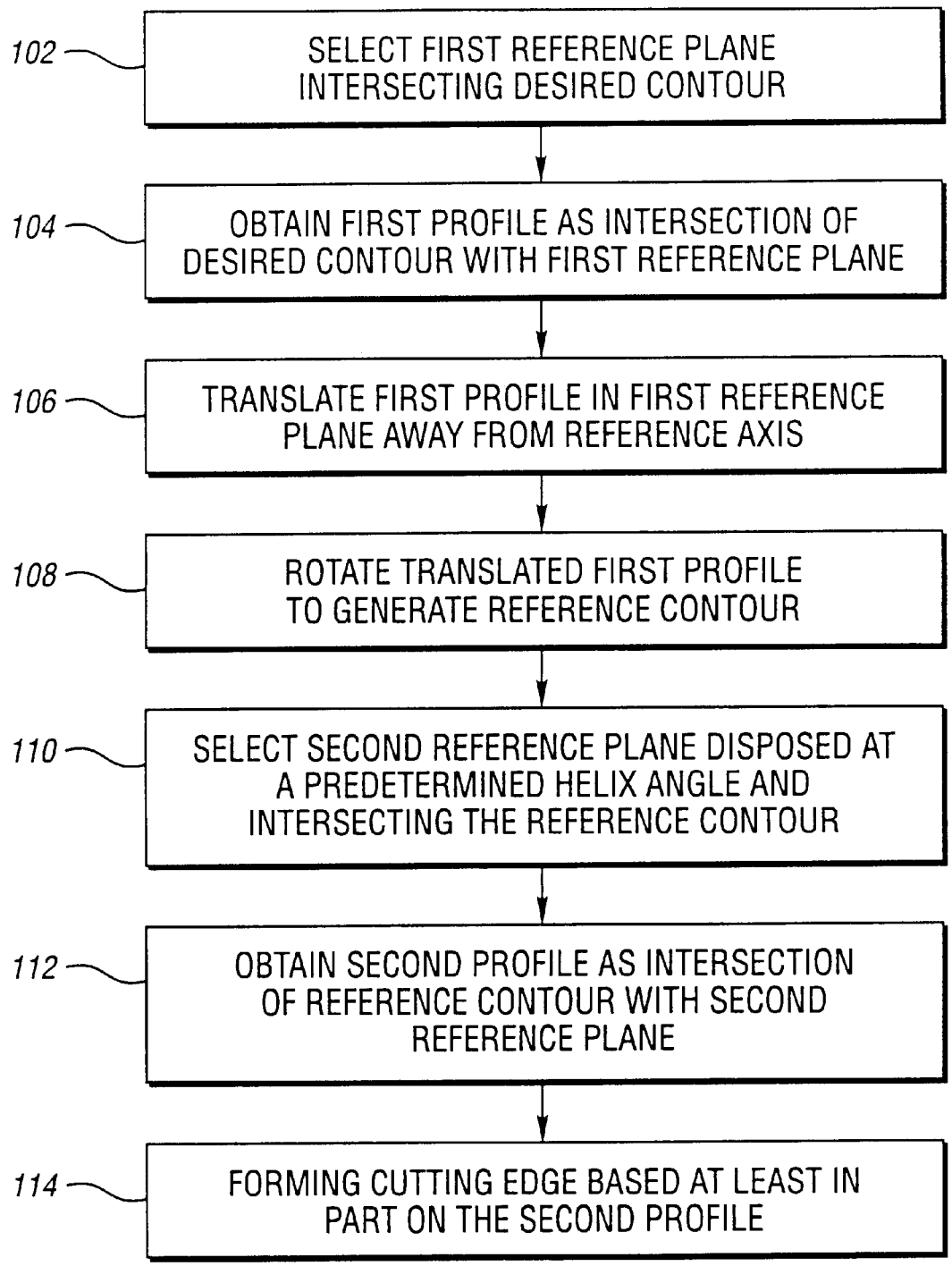
FIG. 2 is a flow chart illustrating the main steps of an exemplary method for making a cutting insert for use in an ID rotary cutter that supports the insert's cutting edge at a nonzero axial rake angle.

FIG. 2 is a flow chart illustrating the main steps of an exemplary method 100 for making a cutting insert for use in milling the nipple 18 with the cutter 10 such that each insert's cutting edge 24 is disposed at a nonzero helix angle relative to the rotational axis 14 of the cutter 10. As further illustrated in FIGS. 1 and 3–5, under step 102 of the exemplary method 100, a first reference plane 26 is selected such that the first reference plane 26 intersects both the reference axis 16 and the nipple's outer surface 20 (in this example, the selected first reference plane 26 is a horizontal plane as shown in FIG. 1). As best seen in FIG. 3, under step 104, a first profile 28 of the desired contour 22 of the nipple's outer surface 20 is obtained as the intersection of the outer surface 20 with the first reference plane 26. Also as seen in FIG. 3, at step 106, the first profile 28 is then translated within the first reference plane 26 in a direction normal to the reference axis 16 to obtain a translated first profile 30 that is no less than a minimum distance x away from the reference axis. The minimum distance x is greater than the maximum radius $R_2$ of the nipple 18 and, preferably, is equal to the sum of the maximum radius $R_2$ of the nipple 18 and a safety factor. By virtue of the translation of first profile 28 within the first reference plane 26, the difference between the original contour's minimum and maximum radii $R_1$, $R_2$ is maintained in the translated profile 30.

Figure 4:
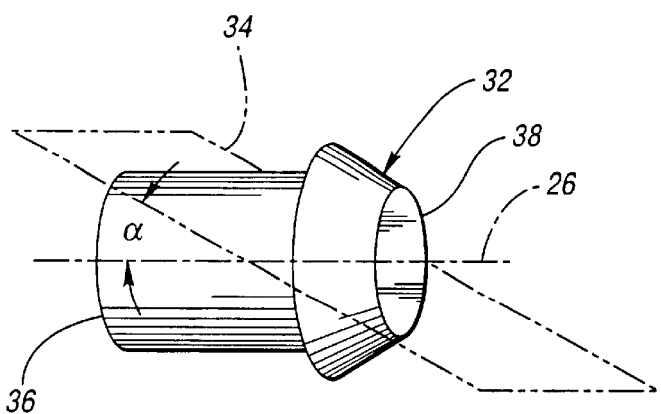

As illustrated in FIG. 4, under step 108 of the exemplary method 100, the translated first profile 30 is rotated about the reference axis 16 to generate a three-dimensional reference contour 32. At step 110, a second reference plane 34 is selected that is disposed at a predetermined helix angle α relative to the reference axis 16 and intersecting the reference contour 32. Preferably, the reference contour 32 includes a first longitudinal end 36 and a second longitudinal end 38, and the helix angle α is selected such that the second reference plane 34 intersects both longitudinal ends 36,38 of the reference contour 32. In this manner, the second reference plane 34 will necessarily likewise intersect the outer surface 20 of the finished part 18 along its entire finished length upon engagement of the insert's cutting edge 24. It will be appreciated that the preference that the second reference plane 34 intersect both longitudinal ends 36,38 of the reference contour 32 defines an upper limit for the selected helix angle α, and that the material from which the part 18 is to be milled is preferably also considered when selecting the helix angle α to be used with the invention.

Figure 5:
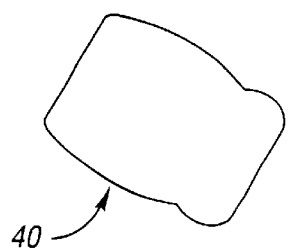

As seen in FIGS. 4 and 5, under step 112 of the exemplary method 100, a second profile 40 of the reference contour 32 is obtained as the intersection of the reference contour 32 with the second reference plane 34. At step 114, the cutting edge 24 of the insert 12 is formed based at least in part on the second profile 40. As seen in FIGS. 6 and 7, the cutting edge 24 is nominally coplanar along a majority of its length when viewed from within the second reference plane 34, thereby advantageously reducing the cost and complexity of generating the cutting edge 24 on the insert 12 while further providing a cutter 10 equipped with such inserts 12 with a consistent tool pressure and cutting rate. Additional benefits may include improved tool life and reduced tool chatter.

Referring to FIGS. 8 and 9, where the part's finished surface 20 and, hence, the expanded reference contour 42 is a right-hand cylinder, the second profile 44 obtained as the intersection of the reference contour 42 and the second reference plane 46 is conveniently a portion of an ellipse. In the event that a direct CAD to CNC machine capability is present, it will be appreciated that the insert's cutting edge 24 can be very precisely defined, thereby providing superior cylindrical accuracy to the resulting part.

In accordance with a further feature of the invention, the exemplary method 100 advantageously focuses on the fact that the smaller diameter contour is controlled by the path of the cutter 10 around the work, such that the actual diameter of the finished part is disassociated from the determined grinding profile required on the cutting edge 24 of the insert 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, while the exemplary methods each obtain the second profile based on the intersection of the generated reference contour with the second reference plane, it will be appreciated that, for certain geometries including simple right-hand cylinders, the second profile may likewise be obtained by projecting the generated reference contour on a third reference plane that is similarly disposed at the predetermined helix angle relative to the reference axis of the part, but that is offset from the reference axis such that the third reference plane does not literally intersect the reference contour. And, while the exemplary insert of FIGS. 1, 6, and 7 include a central aperture by which to removably secure the insert within a suitable recess defined in the cutter body, the invention can be used to make inserts that are secured to the cutter body by any suitable method, for example, as by brazing.

We claim:

1. A method for making a cutting insert useful for milling an outer surface of a workpiece with a rotary cutter, the outer surface being characterized by a desired contour including a first surface portion having a minimum radius relative to a reference axis and a second portion having a maximum radius relative to the reference axis, the method comprising:

selecting a first reference plane intersecting both the reference axis and the outer surface;

obtaining a first profile of the desired contour of the outer surface as the intersection of the outer surface with the first reference plane;

translating the first profile within the first reference plane in a direction normal to the reference axis such that the first profile is no less than a minimum distance away from the reference axis, the minimum distance being greater than the maximum radius;

rotating the translated first profile about the reference axis to generate a reference contour;

selecting a second reference plane disposed at a predetermined helix angle relative to the reference axis and intersecting the reference contour;

obtaining a second profile of the reference contour as the intersection of the reference contour with the second reference plane; and forming a cutting edge of the insert based at least in part on the second profile.

2. The method of claim 1, wherein the minimum distance is equal to the sum of the maximum radius plus a predetermined safety factor.

3. The method of claim 1, wherein forming includes programming a CNC machine to follow the second profile.

4. The method of claim 3, wherein programming includes approximating the second profile using a plurality of three-dimensional coordinates.

5. The method of claim 1, further including selecting the helix angle such that the second reference plane intersects the outer surface along a length thereof to be formed upon engagement of the cutting edge of the insert with the workpiece.

6. A method for making a cutting insert for an ID rotary cutter, the insert being useful for milling an outer surface of a generally-cylindrical workpiece characterized by a desired contour including a first surface portion having a nominal radius relative to a reference axis, the method comprising:

selecting a first reference plane intersecting both the reference axis and the outer surface;

obtaining a first profile of the desired contour of the outer surface as the intersection of the outer surface with the first reference plane;

translating the first profile within the first reference plane in a direction normal to the reference axis such that the first profile is no less than a minimum distance away from the reference axis, the minimum distance being greater than the nominal radius;

generating a reference contour based on the translated first profile and the reference axis to generate a reference contour, the generated reference contour having a first longitudinal end and a second longitudinal end relative to the reference axis;

selecting a second reference plane intersecting the first and second ends of the reference contour and disposed at a predetermined angle with respect to the reference axis;

obtaining a second profile of the reference contour as the intersection of the reference contour with the second reference plane; and forming a cutting edge of the insert based at least in part on the second profile.

7. The method of claim 6, wherein forming includes programming a CNC machine to follow the second profile.

8. The method of claim 7, wherein programming includes approximating the second profile using a plurality of three-dimensional coordinates.

9. The method of claim 6, further including selecting the angle such that the second profile extends between the first and second ends of the reference contour.

* * * * *